(12) United States Patent
Fisher

(10) Patent No.: US 10,065,596 B2
(45) Date of Patent: Sep. 4, 2018

(54) VEHICLE SAFETY BELT

(71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 239 days.

(21) Appl. No.: 15/070,750

(22) Filed: Mar. 15, 2016

(65) Prior Publication Data

US 2016/0272147 A1  Sep. 22, 2016

Related U.S. Application Data

(60) Provisional application No. 62/134,405, filed on Mar. 17, 2015.

(51) Int. Cl.
| | |
|---|---|
| B60R 21/00 | (2006.01) |
| B60R 22/02 | (2006.01) |
| B60R 22/14 | (2006.01) |
| B60R 22/26 | (2006.01) |
| B60N 2/28 | (2006.01) |
| B60R 21/02 | (2006.01) |

(52) U.S. Cl.
CPC ............ *B60R 22/023* (2013.01); *B60R 22/14* (2013.01); *B60R 22/26* (2013.01); *B60N 2/2839* (2013.01); *B60R 21/02* (2013.01); *B60R 2022/027* (2013.01)

(58) Field of Classification Search
CPC ....... B60R 22/023; B60R 22/14; B60R 22/26; B60R 21/02; B60R 2021/022; B60N 2/2839; B60N 2/286; A47D 15/006
USPC .......................................... 297/474, 487, 488
See application file for complete search history.

(56) References Cited

U.S. PATENT DOCUMENTS

| | | | | |
|---|---|---|---|---|
| 4,832,367 | A * | 5/1989 | Lisenby | B60R 22/024 24/265 R |
| 5,275,468 | A * | 1/1994 | Vacanti | B60R 22/14 297/482 |
| 6,174,032 | B1 * | 1/2001 | Conaway | B60N 2/265 297/483 |
| 8,419,127 | B1 * | 4/2013 | Wilhelm | B60R 22/02 280/808 |
| 2002/0074847 | A1 * | 6/2002 | Terpselas | B60R 22/024 297/483 |

* cited by examiner

*Primary Examiner* — Syed A Islam
(74) *Attorney, Agent, or Firm* — Hovey Williams LLP

(57) ABSTRACT

A removable safety belt harness assembly is operable to removably secure an object at a station to restrict egress. The assembly includes flexible safety belts and a belt positioning frame. The frame includes a pair of frame connectors that are each attached to a restraining section of a corresponding belt. The frame restricts relative movement between the safety belts.

27 Claims, 9 Drawing Sheets

VEHICLE SAFETY BELT

RELATED APPLICATION

This application claims the benefit of U.S. Provisional Application Ser. No. 62/134,405, filed Mar. 17, 2015, entitled VEHICLE SAFETY BELT, which is hereby incorporated in its entirety by reference herein.

BACKGROUND

1. Field

The present invention relates generally to safety belts and harnesses used in vehicles. In particular, embodiments of the present invention concern a safety belt harness with safety belts and a belt positioning frame to restrict movement of the safety belts.

2. Discussion of Prior Art

Safety belts and harnesses are commonly used in various types of motor vehicles to safely restrain one or more occupants in the seat of a vehicle. Conventional safety harnesses include two or more belts anchored to the chassis of the vehicle and a buckle assembly to removably connect the belts to one another. Known harnesses include 3-point, 4-point, 5-point, and 6-point harnesses that provide varying levels of convenience and safety. While 3-point harnesses are ubiquitous in passenger cars, emergency vehicles used for emergency response and rescue often use 4-, 5-, or 6-point harnesses to more safely restrain the occupants.

However, conventional safety harnesses, particularly 4-, 5-, and 6-point harnesses, have various deficiencies. For instance, prior art harnesses are structurally complicated and are known to be difficult for the seated occupant to fasten. Conventional harnesses are also prone to being fastened such that one or more belts of the harness is positioned incorrectly over the seated occupant. An incorrectly positioned harness is known to cause discomfort to the occupant and can reduce the effectiveness of the harness as a restraining device.

SUMMARY

The following brief summary is provided to indicate the nature of the subject matter disclosed herein. While certain aspects of the present invention are described below, the summary is not intended to limit the scope of the present invention.

Embodiments of the present invention provide an safety harness that does not suffer from the problems and limitations of the prior art safety harnesses set forth above.

A first aspect of the present invention concerns a removable safety belt harness assembly operable to removably secure an object at a station to restrict egress therefrom. The removable safety belt harness broadly includes a flexible lap safety belt, a flexible shoulder safety belt, and a belt positioning frame. Each of the shoulder and lap safety belts includes an elongated restraining section operable to engage the object in the station in a secured condition. The safety belts each include an elongated restraining section operable to engage the object in the station in a secured condition. The restraining sections extend transversely to one another and are shiftable between the secured condition and a released condition where the object is removable from the station. The belt positioning frame includes a pair of frame connectors that are each attached to a corresponding one of the restraining sections. Each frame connector is attached to the corresponding restraining section at spaced apart locations spaced along the length of the corresponding restraining section, with the frame restricting relative movement between the safety belts.

A second aspect of the present invention concerns a belt positioning frame configured to interconnect a pair of flexible safety belts, with the safety belts including elongated restraining sections operable to engage an object in a secured condition. The belt positioning frame broadly includes a pair of frame connectors and an intermediate body. The frame connectors are each attached to a corresponding one of the restraining sections. The intermediate body extends continuously from one frame connector to the other frame connector to restrict relative movement therebetween. Each frame connector is operable to be attached to the corresponding restraining section at spaced apart locations spaced along the length of the corresponding restraining section, with the frame being operable to restrict relative movement between the safety belts. The belt positioning frame presents a pair of continuous belt passages extending transversely to one another. The passages are defined at least partly by the frame connectors and are operable to slidably receive the safety belts so that the safety belts can slide along the passages.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
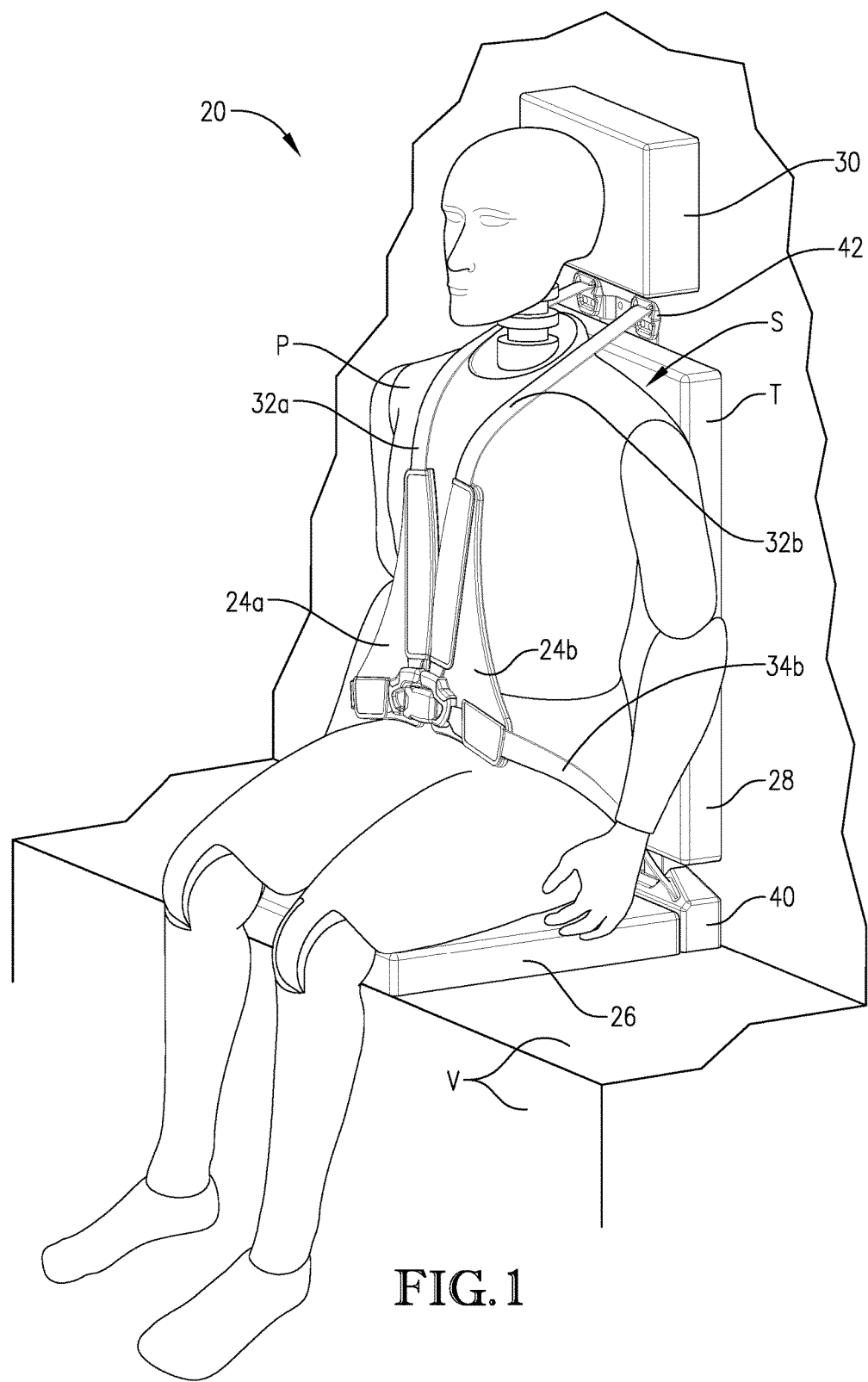
FIG. 1 is a front perspective of a safety belt harness assembly constructed in accordance with a preferred embodiment of the present invention, showing the harness assembly in use to restrain an occupant in the seat of a vehicle.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIG. 1, a safety belt harness assembly 20 is constructed in accordance with a preferred embodiment of the present invention. The illustrated harness assembly 20 is preferably used to secure an occupant P in the seat T of a commercial vehicle V. In particular, the seat T defines a station S in which the occupant P is seated. However, it is within the ambit of the present invention where the assembly 20 can secure the occupant P in an alternative seating station, such as a seat in a passenger car, boat, or aircraft. Furthermore, the assembly 20 can be used to secure objects other than the occupant P. The assembly 20 preferably includes a belt harness 22 and belt positioning frames 24a,b.

The vehicle V preferably includes a bench section 26 that supports the seat T. The seat T preferably includes a seat bottom 26, a seat back 28, and a headrest 30.

Turning to FIGS. 1-4, 8, and 9, the belt harness 22 is configured to removably secure the occupant P in the station S in a secured condition. The belt harness 22 preferably includes a pair of shoulder belts 32a,b and a pair of lap belts 34a,b. The belt harness 22 also preferably includes buckle and tongue connectors 36,38, retractor assemblies 40, and a belt guide 42.

The belts 32,34 each include a continuous length of belt webbing material 44. In the usual manner, the webbing material 44 preferably comprises a flexible woven fabric made of a synthetic resin material. However, the belts 32,34 could include one or more alternative materials.

The belts 32,34 are elongated and preferably present an anchor end 46 and a connector end 48. As explained below, each anchor end 46 is attached to a corresponding retractor assembly 40, and each connector end 48 is attached to a corresponding connector 36,38.

Each belt 32,34 also preferably presents a restraining section 50 adjacent the connector end 48. As will be discussed, the restraining sections 50 are configured to be engaged by the belt positioning frames 24.

Each belt 32,34 also preferably presents an inner belt surface 52 and an outer belt surface 54 that both extend continuously from the anchor end 46 to the connector end 48.

Turning to FIGS. 1-4 and 8, each retractor assembly 40 is configured to retract and tension a corresponding pair of shoulder and lap belts 32,34. Each retractor assembly 40 also selectively permits deployment of the corresponding pair of shoulder and lap belts 32,34. The illustrated retractor assemblies 40 have some components that are generally mirror images of one another, but the assemblies 40 are otherwise the same.

Figure 8:
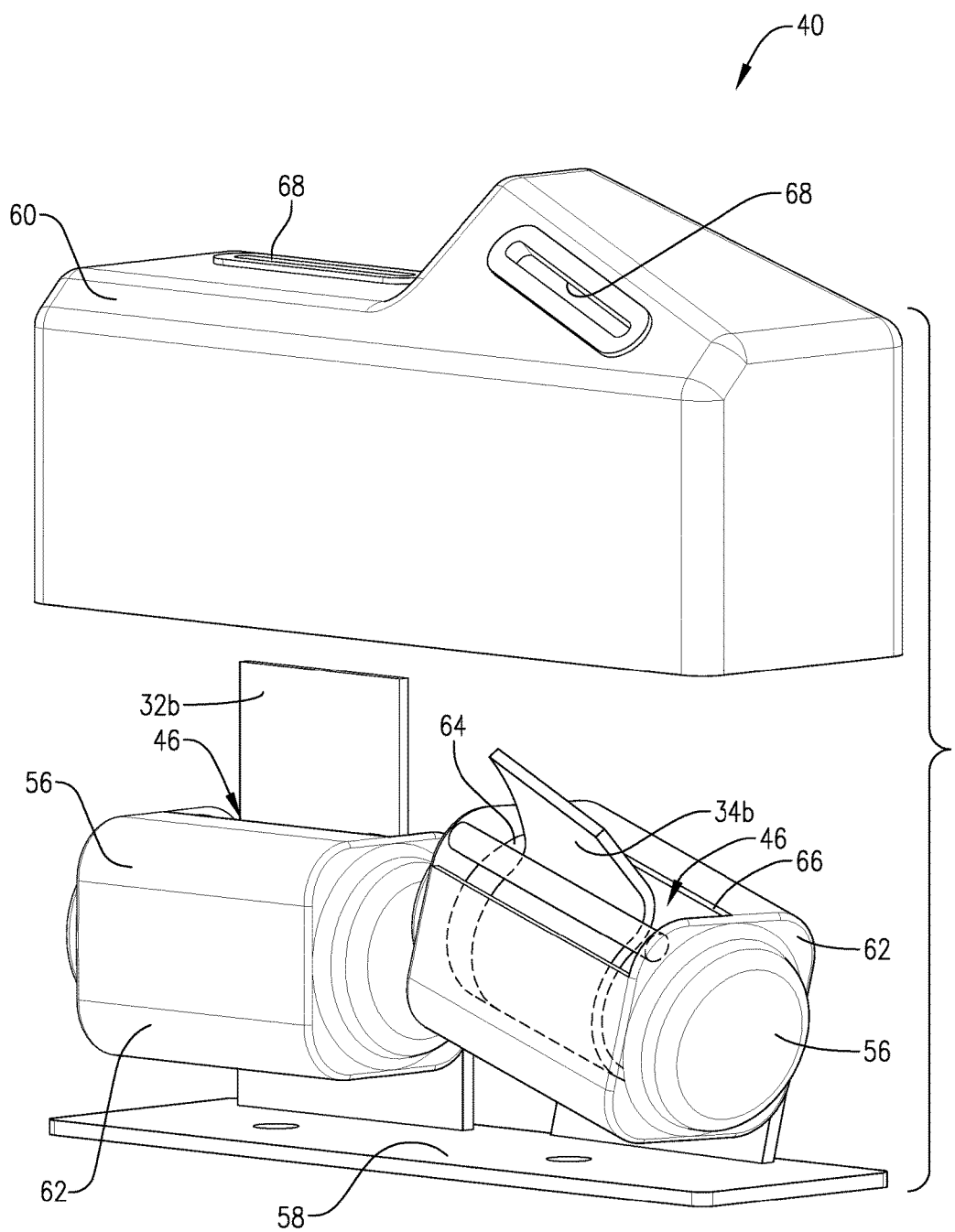
FIG. 8 is a perspective of one of the retractor assemblies shown in FIGS. 1-4, with a cover of the retractor assembly being removed to show a frame and retractors of the retractor assembly.
Figure 9:
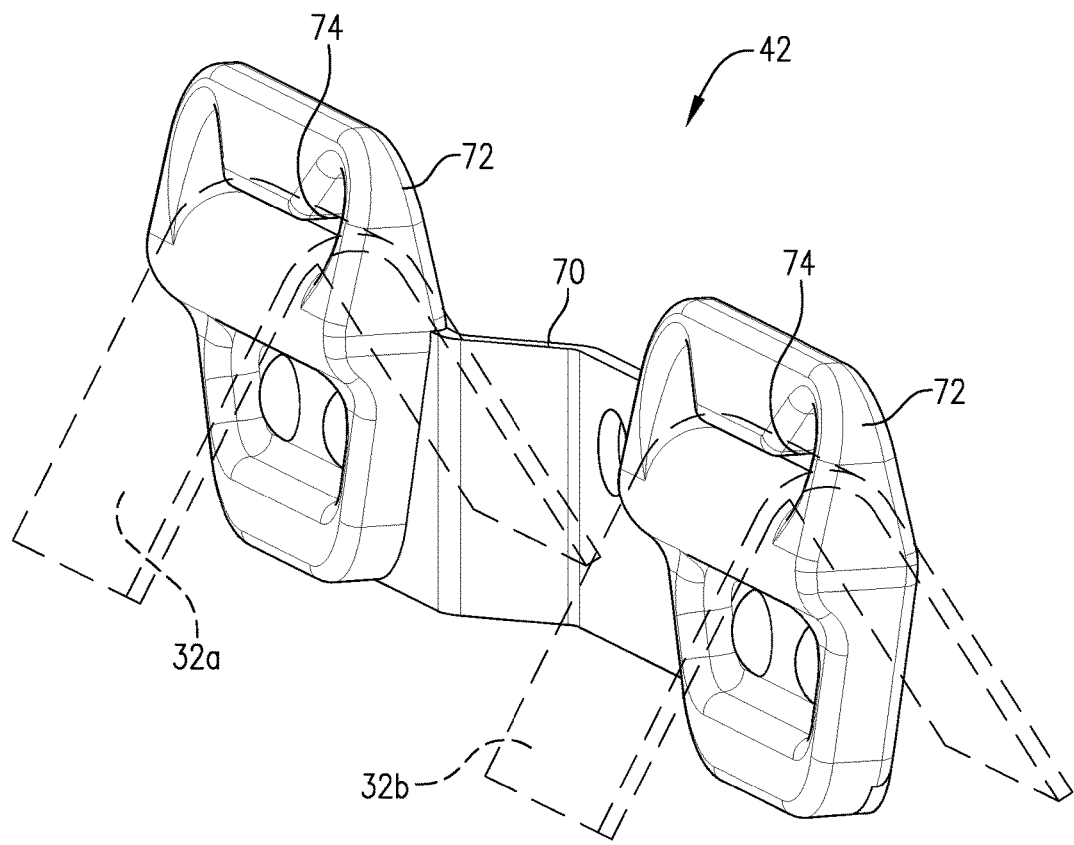
FIG. 9 is a fragmentary perspective of the belt guide shown in FIGS. 1-4.

The retractor assembly 40 preferably includes a pair of retractors 56, a frame 58, and a cover 60 (see FIG. 8). Each retractor 56 preferably includes a housing 62 and a spring-loaded spool 64 that is rotatably mounted in the housing 62. The housing presents an opening 66 that permits the corresponding belt 32,34 to extend into and out of the housing 62.

The frame 58 preferably comprises a unitary mounting bracket that includes alloy carbon steel. The retractors 56 are each preferably fixed to the frame 58, which is preferably fixed to the vehicle V.

The cover 60 is removably mounted to receive the retractors 56 and frame 58. The cover 60 presents slotted openings 68 that slidably receive the respective belts 32,34.

The illustrated retractor assemblies 40 are preferably fixed relative to the seat T and located adjacent to opposite sides of the station S. The retractor assemblies 40 are positioned below the seat back 28 and behind the seat bottom 26.

The anchor ends 46 of the shoulder and lap belts 32,34 are preferably fixed to respective spools 64 of the retractors 56. As is customary, the retractors 56 include a spring (not shown) that urges the spools 64 to draw the belts 32,34 into the retractors 56 by winding the belts 32,34 onto the spools 64. When the belt harness 22 is in the secured condition, the retractors 56 preferably pull the respective belts 32,34 taut.

While the belt harness 22 preferably includes the illustrated retractor assemblies 40, the belt harness 22 could be alternatively configured. For instance, the belt harness 22 could include one or more alternative retractor assemblies 40. It will also be appreciated that the retractors 56 could be alternatively positioned relative to the seat T. For instance, retractors 56 associated with the shoulder belts 32 could be positioned above the seat back 28 while retractors 56 associated with the lap belts 34 are positioned below the seat back 28.

Furthermore, at least some of the retractor assemblies 40 could be replaced with an anchor structure (not shown) to fix corresponding anchor ends 46 to part of the vehicle V. In such an alternative configuration, the corresponding belt 32,34 would not be mechanically retractable by the anchor structure (although the length of the belt 32,34 could be adjusted using another mechanism). For example, the anchor ends 46 of the lap belts 34 could each be fixed to the vehicle V with a rigid anchor structure.

Turning to FIGS. 1-4 and 9, the belt guide 42 slidably receives the shoulder belts 32a,b and includes a mounting bracket 70 and guides 72 fixed to the bracket 70. The guides 72 present openings 74 to receive the shoulder belts 32a,b. The belt guide 42 is preferably fixed to the vehicle V and positioned vertically between the seat back 28 and the headrest 30.

The belt guide 42 is configured to direct the shoulder belts 32a,b from corresponding retractors 56, along a passage presented behind the seat back 28, and between the seat back 28 and the headrest 30 so that the restraining sections 50 extend in front of the seat back 28.

It is within the scope of the present invention where the belt guide 42 has an alternative construction. Furthermore, the belt harness 22 could be devoid of the belt guide 42 (e.g., where the retractors 56 for the shoulder belts 32a,b are positioned above the seat back 28).

Turning to FIGS. 2-7, the buckle and tongue connectors 36,38 each interconnect and permit deployment and retraction of a corresponding pair of belts 32,34. In the illustrated embodiment, the buckle connector 36 preferably interconnects belts 32b,34b, and the tongue connector preferably interconnects belts 32a,34a.

Figure 2:
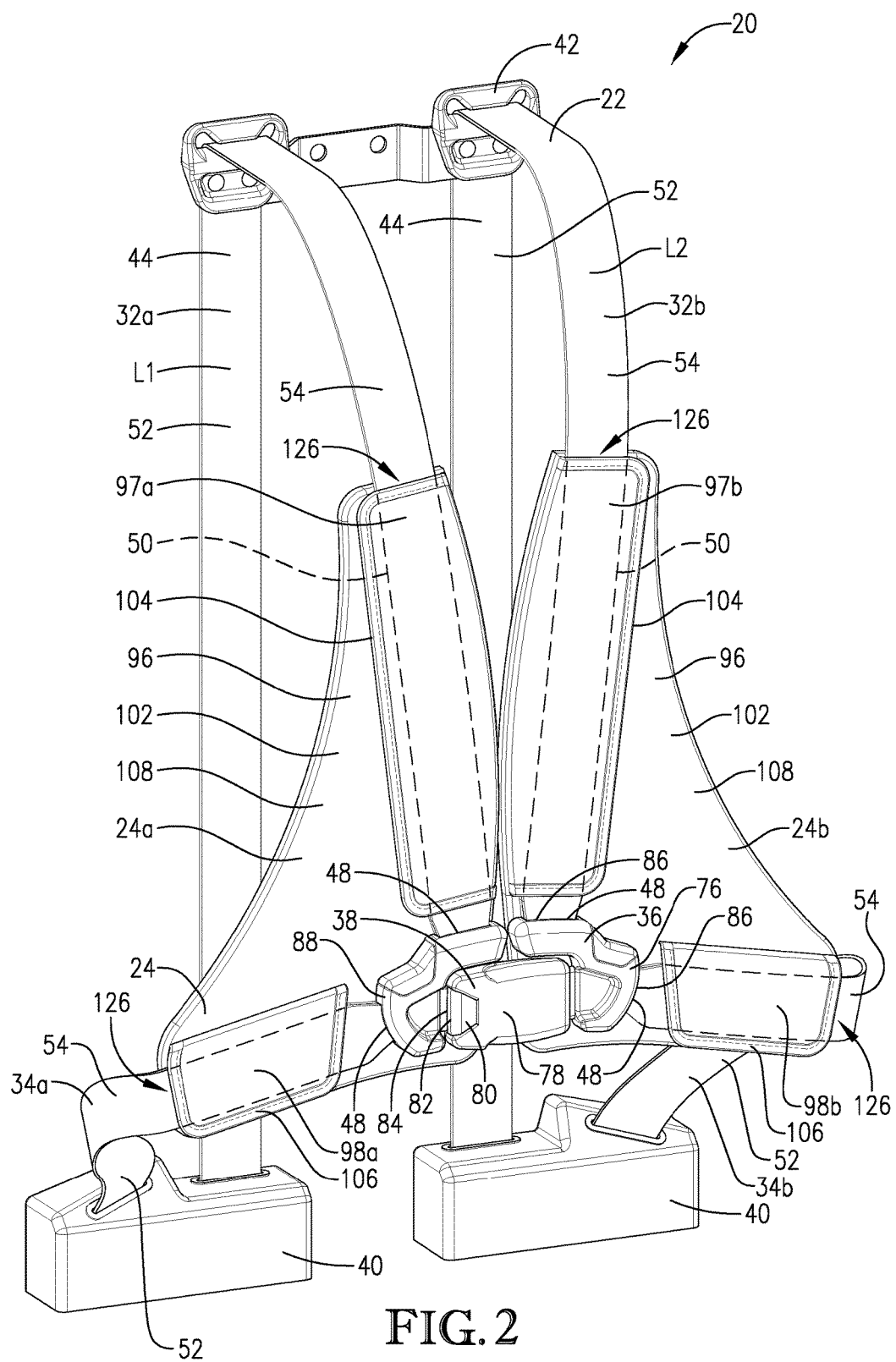
FIG. 2 is a front perspective of the safety belt harness assembly shown in FIG. 1, showing safety belts, belt positioning frames, retractor assemblies, buckle and tongue connectors, and a belt guide of the harness assembly, with the connectors being attached to one another so that the harness assembly is in a secured condition.
Figure 3:
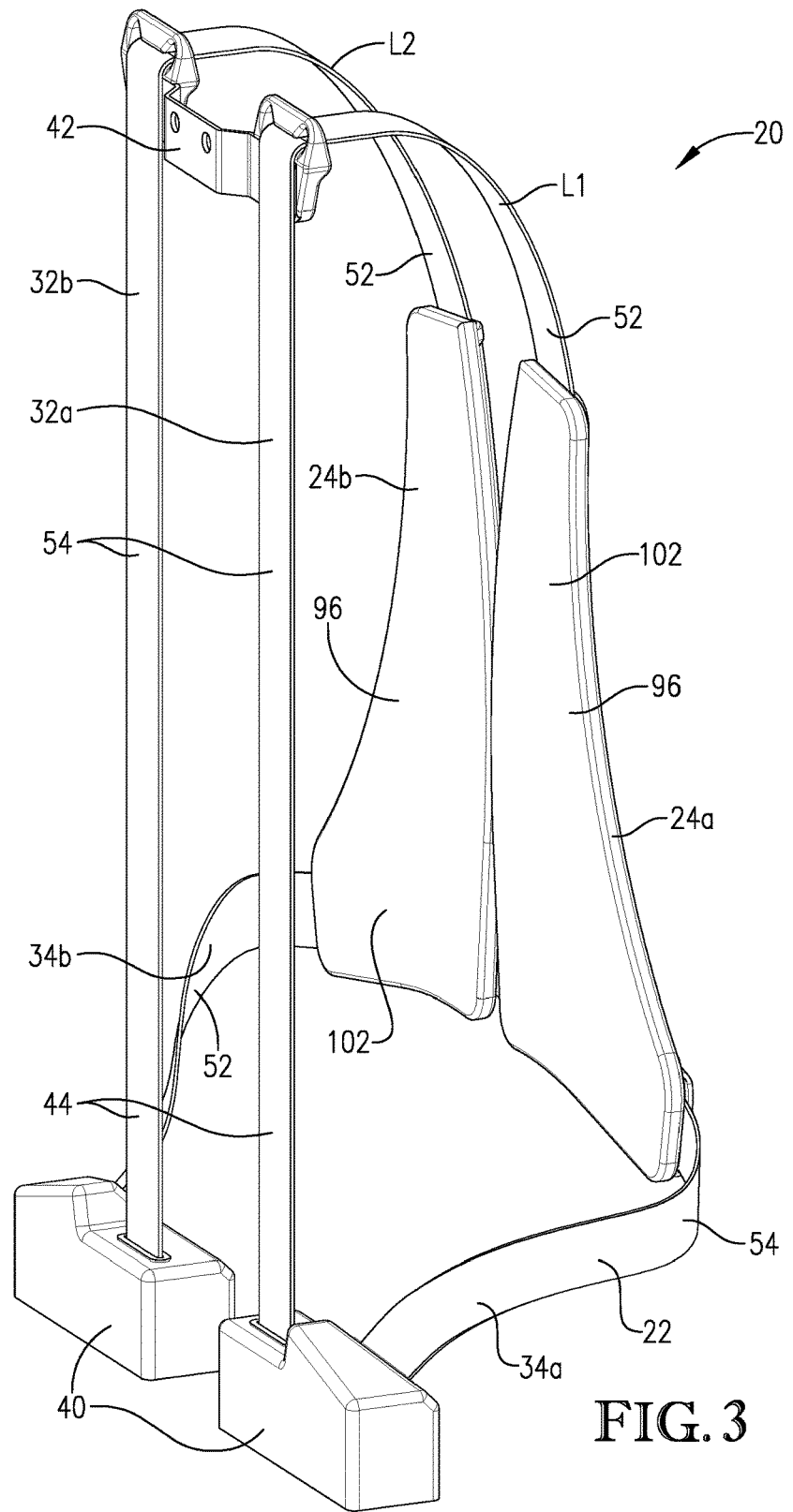
FIG. 3 is a rear perspective of the safety belt harness assembly shown in FIG. 1.
Figure 4:
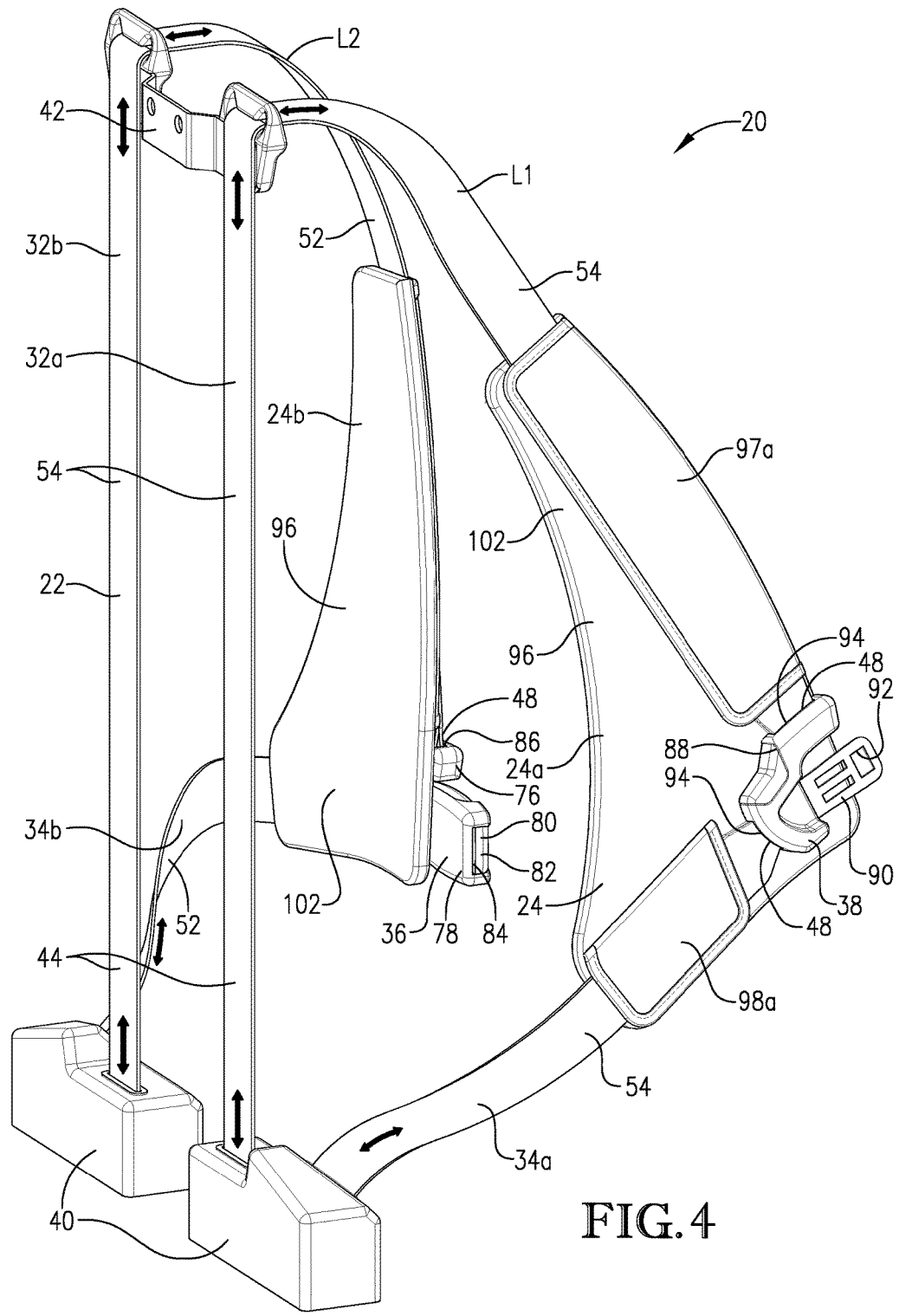
FIG. 4 is a rear perspective of the safety belt harness assembly similar to FIG. 3, but showing the connectors detached from each other so that the harness assembly is in a released condition.

The buckle connector 36 preferably includes a body 76, a buckle housing 78, and a buckle mechanism 80 (see FIG. 2). The buckle mechanism 80 is conventional and preferably includes a release button 82 that is slidably mounted in the buckle housing 78. The buckle mechanism 80 also includes a shiftable catch (not shown) that is shiftably mounted in the buckle housing 78. The catch is accessible via a buckle opening 84 presented by the buckle housing 78 (see FIG. 4). The catch is preferably spring-loaded into a normally closed position (not shown). The catch is engaged by the button 82 so that when the button 82 is depressed by a user, the catch is shifted out of the closed position by the button 82.

In the usual manner, the catch is operable so that insertion of the tongue connector 38 into the buckle opening 84 causes the tongue connector 38 to be removably engaged by the catch in the closed position. By depressing the button 82, the catch is shifted out of the closed position, which moves the catch out of engagement with the tongue connector 38 and thereby releases the tongue connector 38 from the buckle connector 36.

The body 76 of the buckle connector 36 presents belt openings 86 and includes a pair of rods (not shown) mounted in the openings 86. Each connector end 48 of the corresponding pair of belts 32*b*,34*b* is secured to the buckle connector 36 by inserting the connector end 48 into the opening 86 and wrapping the connector end 48 around the corresponding rod. Each of the illustrated connector ends 48 is folded onto and fixed to an adjacent part of the corresponding belt 32*b*,34*b* by multiple threaded seams (not shown).

Thus, the buckle connector 36 preferably connects the connector ends 48 of the corresponding pair of belts 32*b*,34*b* so that the buckle connector 36 and belts 32*b*,34*b* cooperatively form a continuous belt loop L1. The belt loop L1 is preferably configured to be donned by the occupant P so that the shoulder belt 32*a* passes adjacent the occupant's right hand shoulder. The occupant P brings the belt loop L1 into the secured condition by inserting his/her right arm through the belt loop L1 so that the restraining section 50 of the shoulder belt 32*a* is positioned in front of the occupant's torso. The occupant P preferably removes the belt loop L1 by removing his/her right arm from the belt loop L1.

The buckle connector 36 also preferably fixes the connector ends 48 of the corresponding pair of belts 32*b*,34*b* relative to one another so that the connector ends 48 are generally not detachable from each other. However, it will be appreciated that the buckle connector 36 could be configured to permit selective attachment and detachment of the connector ends 48 of the corresponding pair of belts 32*b*, 34*b*. For instance, the buckle connector 36 itself could be comprised of a mating pair of tongue and buckle subconnectors (not shown) that are removably connected to each other and fixed to connector ends 48 of the respective belts 32*b*,34*b*.

Still referring to FIGS. 2-7, the tongue connector 38 preferably includes a body 88 and a tongue 90. The tongue 90 comprises a metal plate that presents a hole 92 (see FIG. 4). The body 88 presents openings 94 and includes a pair of rods (not shown) mounted in the openings 94. Each connector end 48 of the corresponding pair of belts 32*a*,34*a* is secured to the tongue connector 38 by inserting the connector end 48 into the opening 94 and wrapping the connector end 48 around the corresponding rod. Each of the illustrated connector ends 48 is folded onto and fixed to an adjacent part of the corresponding belt 32*a*,34*a* by multiple threaded seams (not shown).

Thus, the tongue connector 38 preferably connects the connector ends 48 of the corresponding pair of belts 32*a*,34*a* so that the tongue connector 38 and belts 32*a*,34*a* cooperatively form a continuous belt loop L2. The belt loop L2 is preferably configured to be donned by the occupant P so that the shoulder belt 32*b* passes adjacent the occupant's right hand shoulder. The occupant P brings the belt loop L2 into the secured condition by inserting his/her right arm through the belt loop L2 so that the restraining section 50 of the shoulder belt 32*b* is positioned in front of the occupant's torso. The occupant P preferably removes the belt loop L2 by removing his/her right arm from the belt loop L2.

The tongue connector 38 also preferably fixes the connector ends 48 of the corresponding pair of belts 32*a*,34*a* relative to one another so that the connector ends 48 are generally not detachable from each other. However, it will be appreciated that the tongue connector 38 could be configured to permit selective attachment and detachment of the connector ends 48 of the respective pair of belts 32*a*,34*a*. For instance, the tongue connector 38 itself could be comprised of a mating pair of tongue and buckle subconnectors (not shown) that are removably connected to each other and fixed to connector ends 48 of the respective belts 32*a*,34*a*.

The connectors 36,38 are configured to be removably attached to one another to secure the belt harness 22 in the secured condition and to thereby secure the occupant P in the seat T. With the occupant P seated in the station S, the occupant P dons each belt loop L1,L2. The belt loops L1,L2 can be donned one at a time or simultaneously. The connectors 36,38 and the belts 32,34 are then drawn toward one another by the occupant P (or another person) so that the connectors 36,38 can be brought into latching engagement with each other in the secured condition. In particular, the tongue 90 of the tongue connector 38 is slidably inserted into the buckle opening 84 of the buckle connector 36 until the catch is inserted into the hole 92 to engage the tongue 90.

In the secured condition, the inner belt surfaces 52 press against the occupant P. Specifically, the retractor assemblies 40 preferably withdraw the belts 32,34 so that the belts 32,34 are pulled taut in the secured condition. Therefore, in the secured condition, the belt harness 22 restricts seat egress.

The connectors 36,38 are also operable to be detached from one another by depressing the button 82. With the button 82 depressed, the catch is shifted out of the closed position so that the catch is removed from the hole 92. In this manner, the catch is disengaged from the tongue 90 and thereby releases the tongue connector 38 from the buckle connector 36. The connectors 36,38 can then be separated so that the belt harness 22 assumes a released condition where the occupant P is released from the belt loops L1,L2 by removing his/her arms from the belt loops L1,L2. Thus, in the released condition, the belt harness 22 permits seat ingress and seat egress.

The illustrated belt harness 22 preferably comprises a 4-point belt harness used to restrain the occupant P in the seat T. However, it is within the ambit of the present invention where the belt harness 22 has an alternative number of belts. For instance, the belt harness 22 could include five (5) or six (6) belts such that the belt harness 22 comprises a 5-point or 6-point belt harness. Similarly, the belt harness 22 could comprise a 3-point belt harness.

Still referring to FIGS. 2-7, the belt positioning frames 24*a,b* are each preferably configured to removably secure a corresponding pair of belts 32,34 to one another. As will be discussed, each belt positioning frame 24*a,b* serves to optimally retain the pair of belts 32,34 in a predetermined orientation relative to the occupant P. Preferably, the illustrated frames 24*a,b* are generally mirror images of one another but otherwise have generally the same construction. Each belt positioning frame 24*a,b* preferably includes a body 96, frame connectors 97*a,b*, and frame connectors 98a,b, with the frame connectors 97,98 being attached to corresponding parts of the body 96.

The body 96 of each belt positioning frame 24a,b preferably comprises a resilient, plate-like structure that serves to restrict relative movement between the respective pair of belts 32,34. Furthermore, the body 96 preferably provides padding between the restraining sections 50 and the occupant P. The illustrated body 96 preferably includes a padded core 100, which comprises a padding material, and a cover layer 102 (see FIG. 5).

The padded core 100 preferably comprises a continuous foam layer that is formed of a synthetic polymer material. The preferred core 100 preferably restricts flexing of the body 96 while enabling the body 96 to be lightweight and resilient. In particular, the foam core 100 preferably permits a flexing force to flex the body 96 from an unflexed condition (see, e.g., FIG. 5) to any of various flexed conditions (not shown). If the body 96 is flexed, the resiliency of the foam core 100 preferably causes the body 96 to return to the unflexed condition once the flexing force is removed.

While the resilient foam material of the core 100 is preferred, the core 100 could include various alternative materials, such as an alternative synthetic resin (e.g., an elastomeric material), wood, and/or metal. Also, while the core 100 preferably permits limited flexing of the body 96, the core 100 (and/or another portion of the body 96) could include a rigid structure that restricts flexing of the body 96.

Yet further, while the core 100 is preferably resilient such that the core 100 causes the body 96 to return to the unflexed condition after being flexed, the core 100 could be configured to allow the body 96 to remain in a flexed condition. For instance, where the core 100 includes a yieldable material (such as an aluminum material) or otherwise includes yieldable features (such as a living hinge), the core 100 could permit the body 96 to be selectively shaped by a user into a flexed condition (e.g., to conform the shape of the body 96 to a person's torso).

The cover layer 102 preferably comprises a flexible outer layer of the body 96 that covers the padded core 100 and permits resilient flexing of the body 96. The illustrated cover layer comprises a woven fabric layer that includes a synthetic resin material. However, the cover layer 102 could include an alternative material without departing from the scope of the present invention. Furthermore, the body 96 could be configured so that the cover layer 102 is secured over only part of the core 100 (e.g., where another part of the core is exposed). Yet further, the body 96 could be devoid of the cover layer 102.

Turning to FIGS. 4-7, the body 96 preferably has a resilient, plate-like structure and presents generally orthogonal upper and lower attachment margins 104,106 along which the respective belts 32,34 are attached to the frame 24 (see FIGS. 4-7). The attachment margins 104,106 are preferably interconnected by a gusset section 108 of the body 96.

However, the body 96 could be alternatively configured and/or shaped. For instance, the attachment margins 104,106 could be arranged to form an oblique angle therebetween.

The frame connectors 97,98 serve to removably secure the respective belts 32,34 to the frame 24. The frame connectors 97,98 each preferably include removable inside and outside attachment flaps 110,112 (see FIGS. 5-7).

Each inside flap 110 is preferably flexible and includes a fabric strip 114 and a hook material strip 116 that are sewn to one another. Similarly, each outside flap 112 is preferably flexible and includes a fabric strip 118 and a loop material strip 120 that are sewn to one another. However, the flaps 110,112 could be alternatively configured without departing from the scope of the present invention. For instance, the flaps 110,112 could be configured so that the hook strip 116 is part of the outside flap 112 and the loop strip 120 is part of the inside flap 110. Also, the positions of a pair of flaps 110,112 could be swapped from the positions shown in the illustrated embodiment.

For each frame connector 97,98, the flaps 110,112 are preferably secured to one another by removably attaching the hook strip 116 to the loop strip 118. However, the flaps 110,112 could have alternative removable connectors (such as snaps, zippers, buttons, etc.) without departing from the scope of the present invention. Yet further, the frame connectors 97,98 could be devoid of flaps 110,112 (e.g., where an alternative connecting structure is used to attach the frames 24 to the corresponding belts 32,34).

Preferably, the flaps 110,112 include hinge margins 122 that are fixed to the corresponding attachment margins 104,106 by sewing the hinge margins 122 to the cover layer 102 along a seam to form a living hinge joint 124. However, the flaps 110,112 could be attached to the body 96 with an alternative connection mechanism (e.g., an alternative removable connector, such as snaps, zippers, buttons, etc., or using an adhesive). When attached to the body 96, the flaps 110,112 are configured to be flexed between a closed condition, where the flaps 110,112 overlap one another and are at least partly connected by the strips 116,120, and an open condition, where the flaps 110,112 are disconnected (e.g., where the flaps 110,112 are spaced from one another).

In the closed condition, the flaps 110,112 and the body 96 cooperatively define belt passages 126 that are configured to receive corresponding restraining sections 50 of the belts 32,34. The belt passages 126 extend lengthwise along the attachment margins 104,106 to define axes A1,A2 (see FIG. 5). In the closed condition, the flaps 110,112 and body 96 preferably permit the corresponding belts 32,34 to slide along the axes A1,A2 of the belt passages 126.

Also in the closed condition, the flaps 110,112 and the body 96 preferably restrict movement of the restraining sections 50 in a direction transverse to the corresponding axes A1,A2. Yet further, the flaps 110,112 and the body 96 restrict rotation of the restraining sections 50 about the corresponding axes A1,A2. The illustrated frame connectors 97,98 are preferably attached to restraining sections 50 of the corresponding belts 32,34 at spaced apart locations spaced along the length of the corresponding restraining section 50. The spaced apart locations associated with each frame connector 97,98 are preferably spaced apart from one another by at least two inches (2"), by at least four inches (4"), or by at least six inches (6").

Other than sliding movement along the corresponding axis A1,A2, this attachment configuration preferably serves to restrict movement of the restraining sections 50 relative to the corresponding frame connector 97,98. Furthermore, the body 96 and frame connectors 97,98 of each frame 24 preferably restrict relative movement between the belts attached to the frame 24 in the closed condition.

While the illustrated frame connectors 97 are preferred to connect the frame 24 to the belts at spaced apart locations spaced along the length of the restraining section 50, the frame connectors 97 could be alternatively configured to be attached to the belt at spaced locations. For instance, the flaps of the frame connectors 97,98 could each include multiple flap segments that are spaced apart from each other along the corresponding axis A1,A2.

The axes A1,A2 of the illustrated belt passages 126 are preferably substantially orthogonal to one another. However, it is within the ambit of the present invention where the belt passages 126 are alternatively positioned. For instance, the belt passages 126 could extend transversely to one another so that the axes A1,A2 cooperatively form an oblique angle therebetween.

Figure 5:
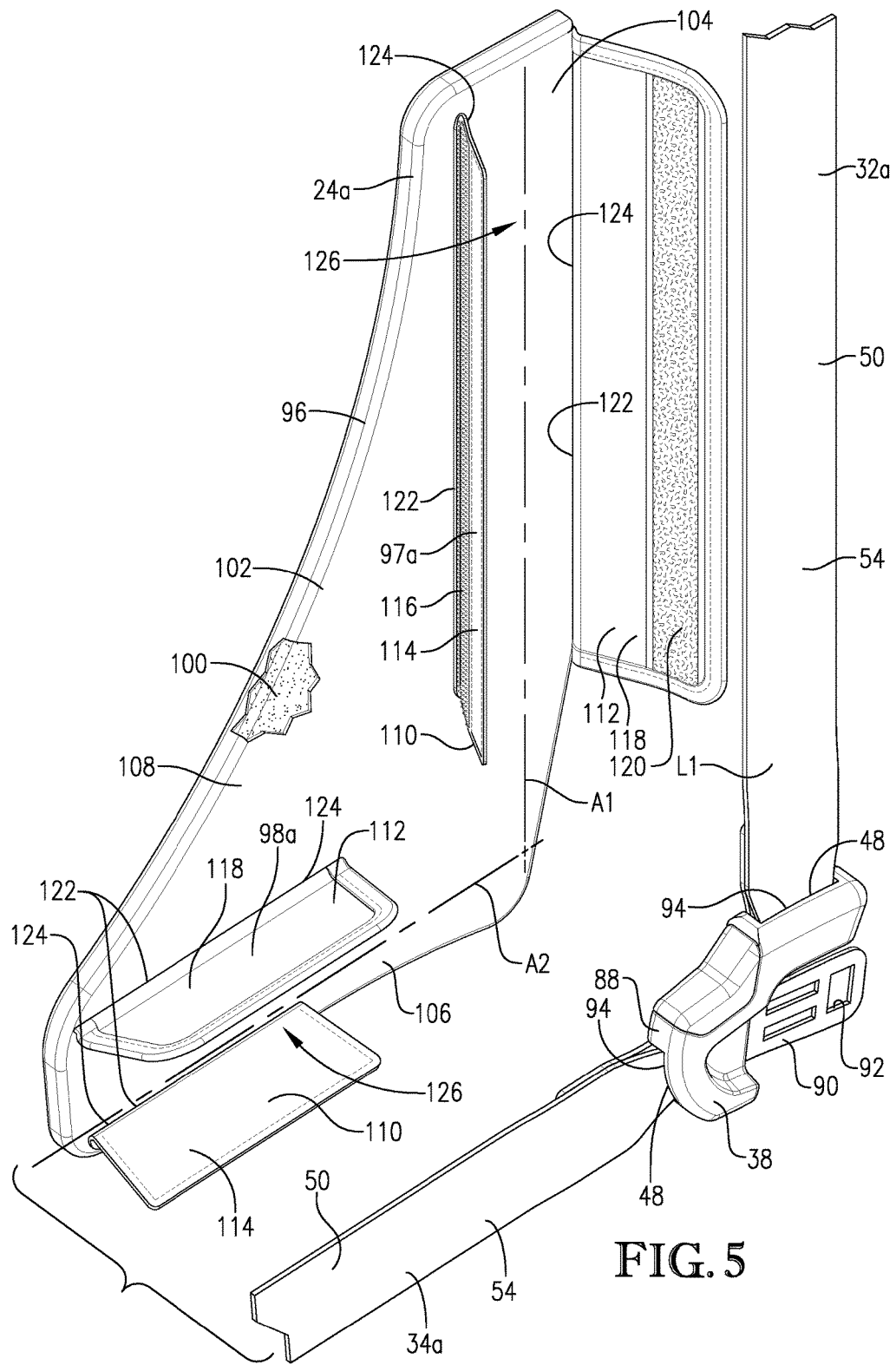
FIG. 5 is a fragmentary upper perspective of the safety belt harness assembly shown in FIGS. 1-4, showing one of the belt positioning frames and the tongue connector fixed to a corresponding pair of belts, with frame connectors of the belt positioning frames being opened to receive the belts.
Figure 6:
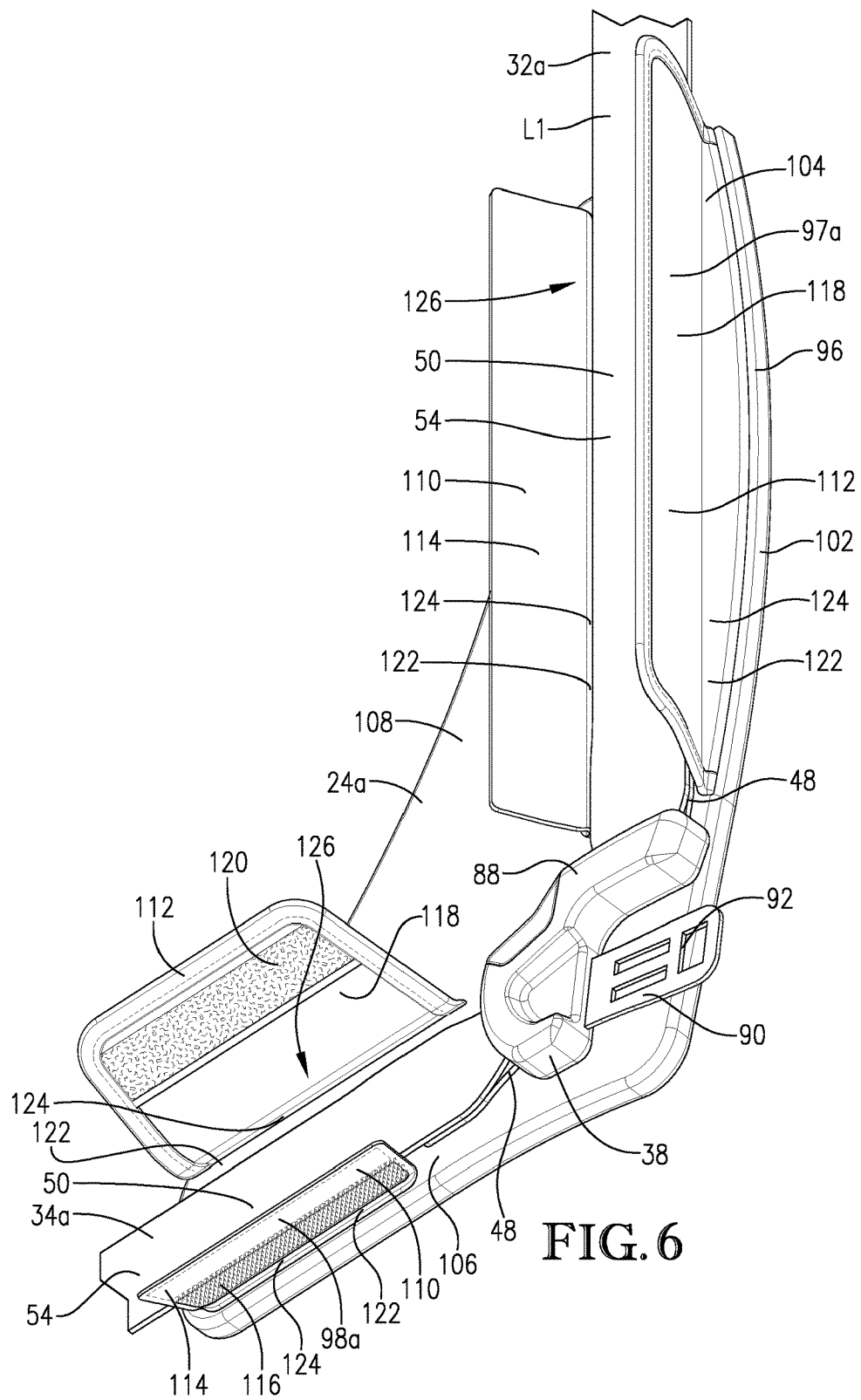
FIG. 6 is a fragmentary lower perspective of the safety belt harness assembly shown in FIGS. 1-5, showing the tongue connector and the corresponding pair of belts positioned so that the belts are received by the frame connectors.
Figure 7:
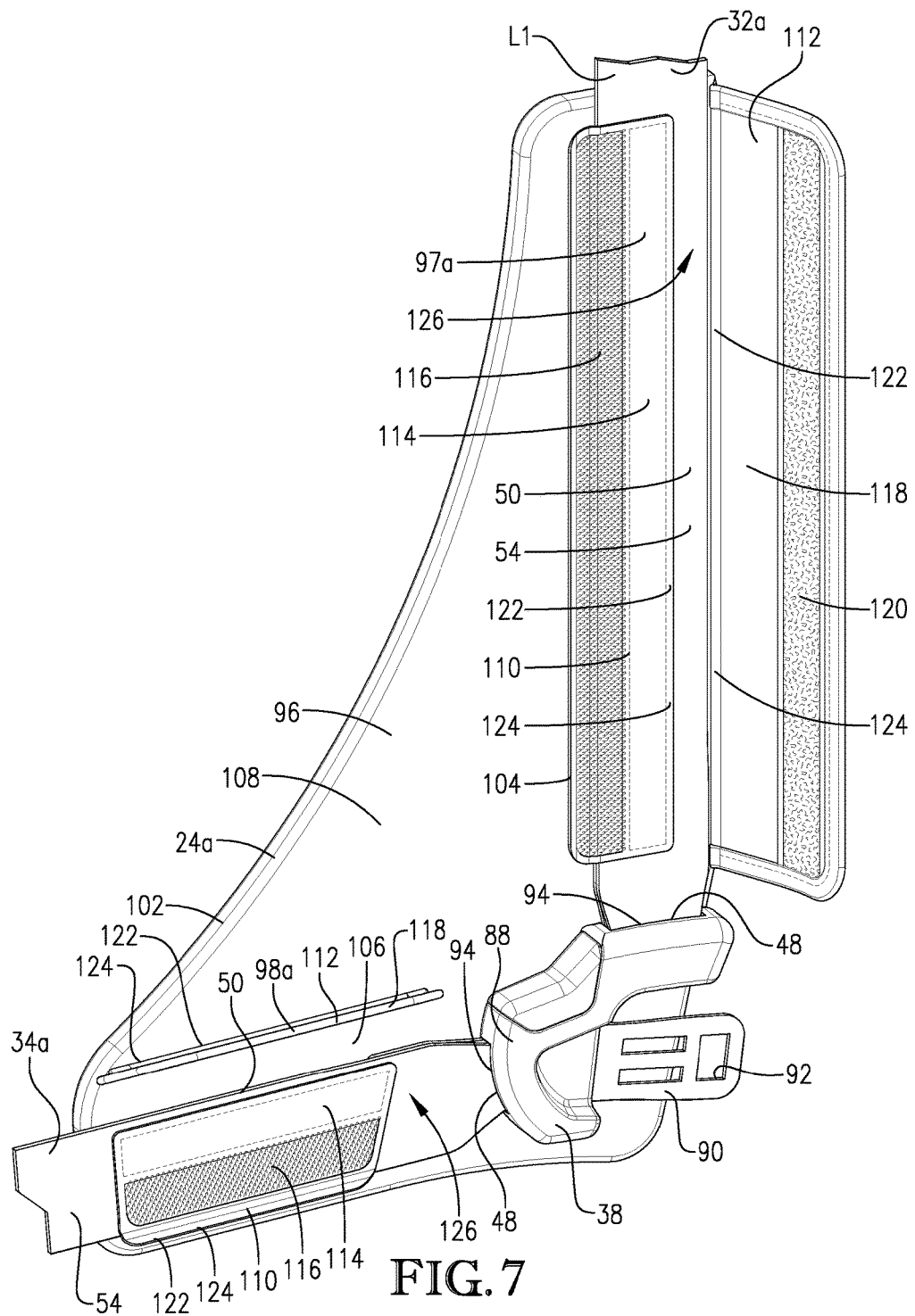
FIG. 7 is a fragmentary upper perspective of the safety belt harness assembly shown in FIGS. 1-6, showing the belts received by the frame connectors, with inside flaps of the frame connectors being folded over the belts.

To attach the frame 24 to a corresponding pair of belts 32,34, the flaps 110,112 are initially located in the open condition so that the passages 126 are open (see FIG. 5). The retraining section 50 of each belt 32,34 is then inserted into the respective passages 126 (see FIG. 6). With the restraining section 50 in the respective passage 126, the inside flap 110 is folded onto the belt 32,34 (see FIG. 7). The outside flap 112 is then folded onto the inside flap 110 so that the strips 116,120 are attached to one another and the restraining section 50 is secured within the passage 126 (see FIG. 2).

It will be appreciated that the belts 32,34 can be attached to the frame 24 either one at a time or both at the same time. Furthermore, the belts 32,34 can be attached to the frame 24 either when the belts 32,34 are in the secured condition (see FIG. 2) or in the released condition (see FIG. 4).

With the belts 32,34 attached to the frame 24, the restraining sections 50 preferably extend substantially orthogonal to one another. However, it is within the ambit of the present invention where the restraining sections 50 are alternatively positioned. For instance, the restraining section 50 could extend transversely so as to cooperatively form an oblique angle therebetween.

To remove the frame 24 from each of the corresponding pair of belts 32,34, the outside flap 112 is separated from the inside flap 110 so that the strips 116,120 are detached from one another. The outside flap 112 and inside flap 110 can then be unfolded to the open condition. Once a set of flaps 110,112 is in the open condition, the respective restraining section 50 can be removed from the passage 126.

When the occupant P is held by the harness assembly 20 in the secured condition, the inner belt surfaces 52 preferably press against the occupant P. In particular, the frames 24 are positioned in a covering relationship with the inner belt surfaces 52 of the restraining sections 50. As a result, the frames 24 are positioned between the restraining sections 50 and the occupant P and provide padding therebetween.

While the frames 24 are connected relative to each other by the belts 32,34 and the connectors 36,38, the depicted frames 24 are preferably not connected directly to one another in the secured condition. In this manner, the frames 24 are allowed to shift relative to each other (e.g., by pivoting or otherwise sliding at least one of the frames 24) as the harness assembly 20 retains the occupant P. However, for some aspects of the present invention, the frames 24 could be connected directly to one another (e.g., by removable connectors, such as a button, snap, zipper, etc.).

Also, the illustrated shoulder belts 32a,b extend continuously along a length from the corresponding connectors 36,38 to the belt guide 42. The harness assembly 20 is preferably configured so that the shoulder belts 32a,b are detached from each other along the entire length from the corresponding connector 36,38 to the belt guide 42. However, for some aspects of the present invention, the shoulder belts 32a,b could be connected to each another along the length from the connectors 36,38 to the belt guide 42.

The illustrated harness assembly 20 preferably includes a pair of frames 24 to position the belts 32,34 relative to one another. However, it is within the scope of the present invention where the harness assembly 20 includes an alternative number of frames 24. For instance, where the belt harness 22 comprises a 6-point harness, at least some of the belts could be interconnected by more than two frames 24.

In use, the occupant P can be selectively secured in the empty station S by the harness assembly 20. If the harness assembly 20 is in the secured condition, the connectors 36,38 are initially detached from each other to permit seat ingress. With the occupant P seated in the station S, the occupant P dons each belt loop L1,L2. The belt loops L1,L2 can be donned one at a time or simultaneously. The connectors 36,38 and the belts 32,34 are then drawn toward one another by the occupant P (or another person) so that the connectors 36,38 can be brought into latching engagement with each other in the secured condition. Once in the secured condition, the retractor assemblies 40 preferably withdraw the belts 32,34 so that the belts 32,34 are pulled taut in the secured condition.

If the frames 24 are initially detached from the belts 32,34, the frames 24 are attached to the corresponding pair of belts 32,34 so that the entire harness assembly 20 is donned by the occupant P. Again, the frames 24 can be attached to the belts either before or after the belt harness 22 is brought into the secured condition.

When the secured occupant P intends to egress from the station S, the connectors 36,38 of the harness assembly 20 are initially detached from each other by depressing the button 82. With the connectors 32,34 detached, the occupant P can permit the retractor assemblies 40 to withdraw the belts 32,34 and the connectors 32,34 away from one another by removing his/her arms from each pair of belt loops L1,L2.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A removable safety belt harness assembly operable to removably secure an object at a station to restrict egress therefrom, said removable safety belt harness comprising:
   a flexible shoulder safety belt;
   a flexible lap safety belt,
   each of said shoulder and lap safety belts including an elongated restraining section operable to engage the object in the station in a secured condition,
   said restraining sections extending transversely to one another and being shiftable between the secured condition and a released condition where the object is removable from the station; and a belt positioning frame including a pair of frame connectors that are each attached to a corresponding one of the restraining sections, each frame connector being attached to the corresponding restraining section at spaced apart locations spaced along the axial length of the corresponding restraining section, with the frame restricting relative movement between the safety belts, said frame including an intermediate body that extends continuously from one frame connector to the other frame connector to restrict relative movement therebetween, said frame connectors each including a pair of opposed flaps located on opposite sides of the corresponding restraining section and cooperatively securing the corresponding restraining section against the body, said flaps of each frame connector including margins attached to the body along respective connection lines that extend alongside each other, with the margins engaging opposite sides of the corresponding restraining section to restrict off-axis movement of the restraining section relative to the body.

2. The removable safety belt harness assembly as claimed in claim 1,
said restraining sections each presenting an inner belt surface to press against the object held in the station,
said frame covering the inner belt surfaces to provide padding between the restraining sections and the object.

3. The removable safety belt harness assembly as claimed in claim 2,
said body including a solid element that restricts bending of the body and restricts movement of the frame connectors relative to each other.

4. The removable safety belt harness assembly as claimed in claim 3,
said solid element including a foam material.

5. The removable safety belt harness assembly as claimed in claim 1,
one of said flaps including hook material and the other one of said flaps including loop material, with the hook and loop material being removably connected to each other to secure the corresponding restraining section.

6. The removable safety belt harness assembly as claimed in claim 1,
said restraining sections each presenting an inner belt surface to press against the object held in the station,
said frame covering the inner belt surfaces to provide padding between the restraining sections and the object.

7. The removable safety belt harness assembly as claimed in claim 6,
said restraining sections each presenting an outer belt surface that faces in an opposite direction to the inner belt surface,
said flaps cooperatively covering the outer belt surface so that the restraining sections are covered by the frame.

8. The removable safety belt harness assembly as claimed in claim 1,
said belt positioning frame presenting a pair of continuous belt passages extending transversely to one another,
said passages cooperatively defined by the body and the frame connectors and slidably receiving the safety belts so that the safety belts can slide along the passages.

9. The removable safety belt harness assembly as claimed in claim 8; and a belt connector fixing the safety belts relative to one another adjacent to the restraining sections, with the belt connector operable to restrict sliding movement of the safety belts along the passages.

10. The removable safety belt harness assembly as claimed in claim 1,
said belt positioning frame presenting a pair of continuous belt passages extending transversely to one another,
said passages defined at least partly by the frame connectors and slidably receiving the safety belts so that the safety belts can slide along the passages.

11. The removable safety belt harness assembly as claimed in claim 10; and
a belt connector fixing the safety belts relative to one another adjacent to the restraining sections, with the belt connector operable to restrict sliding movement of the safety belts along the passages.

12. The removable safety belt harness assembly as claimed in claim 1,
said safety belts each presenting an anchor end and a connector end, said anchor ends operable to be secured adjacent to the station at spaced apart locations,
said connector ends operable to be removably attached relative to the station.

13. The removable safety belt harness assembly as claimed in claim 12; and
a belt connector fixing the connector ends relative to one another and operable to removably attach the connector ends relative to the station.

14. The removable safety belt harness assembly as claimed in claim 12; and
a retractor operably connected to the anchor end of one of the safety belts to pull the one safety belt taut in the secured condition.

15. The removable safety belt harness assembly as claimed in claim 14; and
another retractor operably connected to the anchor end of the other one of the safety belts to pull the other safety belt taut in the secured condition.

16. The removable safety belt harness assembly as claimed in claim 1;
a second flexible shoulder safety belt;
a second flexible lap safety belt,
each of said second shoulder and lap safety belts including a second elongated restraining section operable to engage the object in the station in the secured condition,
said second restraining sections extending transversely to one another and being shiftable between the secured condition and the released condition; and
a second belt positioning frame including a pair of second frame connectors that are each attached to a corresponding one of the second restraining sections,
each of said second frame connectors being attached to the corresponding second restraining section at spaced apart locations spaced along the length of the corresponding second restraining section, with the second frame restricting relative movement between the second safety belts.

17. The removable safety belt harness assembly as claimed in claim 16;
a belt guide operable to be mounted rearwardly of the station,
said shoulder belts slidably received by the guide; and
a belt connector fixing the safety belts relative to one another adjacent to the restraining sections, said shoulder belts extending continuously along a length from the belt connector to the belt guide and being detached from each other along the entire length.

18. The removable safety belt harness assembly as claimed in claim 1,
said spaced apart locations associated with each frame connector being spaced apart from one another by at least two inches.

19. The removable safety belt harness assembly as claimed in claim 1,
said restraining sections each presenting a longitudinal belt axis and a belt width dimension transverse to the belt axis,
said frame connectors each presenting a connector axial length dimension measured along the corresponding belt axis, with the connector axial length dimensions being greater than the belt width dimensions.

20. The removable safety belt harness assembly as claimed in claim 5,
said flaps each including a fabric strip, with the fabric strips attached to and supporting the hook material and loop material, respectively,
at least one of the fabric strips being located between the corresponding restraining section and each of the hook material and the loop material so that the hook material and the loop material are restricted from engaging the corresponding restraining section.

21. A belt positioning frame configured to interconnect a pair of flexible safety belts, with the safety belts including elongated restraining sections operable to engage an object in a secured condition, said belt positioning frame comprising:
a pair of frame connectors that are each attached to a corresponding one of the restraining sections; and
an intermediate body that extends continuously from one frame connector to the other frame connector to restrict relative movement therebetween,
each frame connector operable to be attached to the corresponding restraining section at spaced apart locations spaced along the axial length of the corresponding restraining section, with the frame being operable to restrict relative movement between the safety belts,
said frame connectors each including a pair of opposed flaps configured to be located on opposite sides of the corresponding restraining section and to cooperatively secure the corresponding restraining section against the body,
said flaps of each frame connector including margins attached to the body along respective connection lines that extend alongside each other, with the margins operable to engage opposite sides of the corresponding restraining section to restrict off-axis movement of the restraining section relative to the body,
said belt positioning frame presenting a pair of continuous belt passages extending transversely to one another,
said passages defined at least partly by the frame connectors and operable to slidably receive the safety belts so that the safety belts can slide along the passages.

22. The belt positioning frame as claimed in claim 21,
said body including a solid element that restricts bending of the body and restricts movement of the frame connectors relative to each other.

23. The belt positioning frame as claimed in claim 22,
said solid element including a foam material.

24. The belt positioning frame as claimed in claim 21,
one of said flaps including hook material and the other one of said flaps including loop material, with the hook and loop material being removably connected to each other to secure the corresponding restraining section.

25. The belt positioning frame as claimed in claim 21,
said restraining sections each presenting an inner belt surface to press against the object held in the station,
said frame configured to cover the inner belt surfaces to provide padding between the restraining sections and the object.

26. The belt positioning frame as claimed in claim 25,
said restraining sections each presenting an outer belt surface that faces in an opposite direction to the inner belt surface,
said flaps configured to cooperatively cover the outer belt surface so that the restraining sections are covered by the frame.

27. The belt positioning frame as claimed in claim 21; and
a belt connector fixing the safety belts relative to one another adjacent to the restraining sections, with the belt connector operable to restrict sliding movement of the safety belts along the passages.

\* \* \* \* \*